US009874259B2

(12) United States Patent
Tropp

(10) Patent No.: US 9,874,259 B2
(45) Date of Patent: Jan. 23, 2018

(54) ADJUSTMENT DEVICE FOR A DISC BRAKE

(71) Applicant: KNORR-BREMSE Systeme Fuer Nutzfahrzeuge GmbH, Munich (DE)

(72) Inventor: Martin Tropp, Bad Birnbach (DE)

(73) Assignee: KNORR-BREMSE Systeme fuer Nutfahrzeuge GmbH, Munich (DE)

(*) Notice: Subject to any disclaimer, the term of this patent is extended or adjusted under 35 U.S.C. 154(b) by 0 days.

(21) Appl. No.: 14/268,549

(22) Filed: May 2, 2014

(65) Prior Publication Data

US 2014/0238788 A1 Aug. 28, 2014

Related U.S. Application Data

(63) Continuation of application No. PCT/EP2012/071450, filed on Oct. 30, 2012.

(30) Foreign Application Priority Data

Nov. 3, 2011 (DE) .................. 10 2011 117 587

(51) Int. Cl.
*F16D 65/38* (2006.01)
*F16D 65/52* (2006.01)
(Continued)

(52) U.S. Cl.
CPC ............. *F16D 65/52* (2013.01); *F16D 65/18* (2013.01); *F16D 65/567* (2013.01); *F16D 2125/28* (2013.01)

(58) Field of Classification Search
CPC ........ F16D 65/46; F16D 65/54; F16D 65/183; F16D 65/567; F16D 65/56; F16D 65/568; F16D 2121/08; F16D 65/38; B62L 1/12
(Continued)

(56) References Cited

U.S. PATENT DOCUMENTS 1,975,815 A * 10/1934 Wilson .................. F16B 39/282
411/222
3,115,220 A * 12/1963 Cagle ...................... F16D 65/18
188/196 P
(Continued)

FOREIGN PATENT DOCUMENTS

CN 1831361 A 9/2006
CN 2883783 Y 3/2007
(Continued)

OTHER PUBLICATIONS

International Preliminary Report on Patentability (PCT/IB/326) and (PCT/IB/373) dated May 15, 2014 including Written Opinion (PCT/ISA/237) (six (6) pages).
(Continued)

*Primary Examiner* — Bradley King
*Assistant Examiner* — Stephen Bowes
(74) *Attorney, Agent, or Firm* — Crowell & Mpring LLP

(57) ABSTRACT

An adjustment device is provided for adjusting the wear of brake pads and a brake disk of a disc brake, in particular of a pneumatically actuated disc brake. The disc brake includes a brake application device actuated by a rotary lever, which brake application device has an adjusting spindle into which the adjustment device is insertable. The adjustment device is attached to a brake caliper of the disc brake by way of a bearing disk. The adjustment device is provided with a spindle and at least one friction pairing, each friction pairing having two contact surfaces. The friction pairing has a curved cross-section of at least one of its two contact surfaces.

17 Claims, 2 Drawing Sheets

(51) Int. Cl.
*F16D 65/18* (2006.01)
*F16D 65/56* (2006.01)
*F16D 125/28* (2012.01)

(58) Field of Classification Search
USPC .......................................................... 411/435
See application file for complete search history.

(56) References Cited

U.S. PATENT DOCUMENTS

| | | | | |
|---|---|---|---|---|
| 4,256,205 | A * | 3/1981 | Hamar | F16D 65/46 |
| | | | | 188/196 M |
| 4,306,635 | A * | 12/1981 | Mitchell | F16D 65/18 |
| | | | | 188/370 |
| 7,484,602 | B2 * | 2/2009 | Lraschko | F16D 65/183 |
| | | | | 188/196 BA |
| 2005/0034935 | A1 | 2/2005 | Maehara | |
| 2005/0167211 | A1 * | 8/2005 | Hageman | F16D 65/18 |
| | | | | 188/71.9 |
| 2006/0201755 | A1 | 9/2006 | McCann | |
| 2007/0209890 | A1 | 9/2007 | Iraschko | |
| 2008/0217125 | A1 * | 9/2008 | Iraschko | F16D 65/183 |
| | | | | 188/196 BA |
| 2009/0220296 | A1 * | 9/2009 | Bowling, Jr. | F16B 25/0015 |
| | | | | 403/282 |
| 2010/0243387 | A1 | 9/2010 | Vollert et al. | |
| 2011/0203884 | A1 | 8/2011 | Iraschko et al. | |
| 2012/0111673 | A1 | 5/2012 | Giering et al. | |

FOREIGN PATENT DOCUMENTS

| | | | | |
|---|---|---|---|---|
| CN | 101002036 A | | 7/2007 | |
| CN | 101628587 A | | 1/2010 | |
| CN | 101868646 A | | 10/2010 | |
| DE | 10 2004 037 771 A1 | | 3/2006 | |
| DE | 10 2007 046 953 A1 | | 4/2009 | |
| DE | 10 2008 035 366 A1 | | 2/2010 | |
| DE | 102012012473 | * | 12/2013 | ......... F16D 55/2255 |
| DE | 102013006863 | * | 10/2014 | ............. F16D 65/12 |
| GB | 2106256 A | * | 4/1983 | ............ F16B 31/028 |
| GB | 2469930 A | * | 11/2010 | ............ F16B 31/028 |
| JP | 2008-508490 A | | 3/2008 | |
| JP | 2010-210081 A | | 9/2010 | |
| WO | WO 2006/099938 A1 | | 9/2006 | |

OTHER PUBLICATIONS

International Search Report (PCT/ISA/210) with English translation dated Feb. 6, 2013 (Six (6) pages).
German Office Action dated Aug. 4, 2014 (five (5) pages).
Chinese Office Action issued in counterpart Chinese application No. 201280061159.3 dated Sep. 22, 2015, with English translation (Eight (8) pages).
Japanese-language Office Action issued in counterpart Japanese Application No. 2014-539309 dated Oct. 25, 2016 with English translation (9 pages).

* cited by examiner

ADJUSTMENT DEVICE FOR A DISC BRAKE

CROSS REFERENCE TO RELATED APPLICATIONS

This application is a continuation of PCT International Application No. PCT/EP2012/071450, filed Oct. 30, 2012, which claims priority under 35 U.S.C. §119 from German Patent Application No. 10 2011 117 587.7, filed Nov. 3, 2011, the entire disclosures of which are herein expressly incorporated by reference.

BACKGROUND AND SUMMARY OF THE INVENTION

The invention relates to an adjustment device for adjusting for the wearing of brake pads in a disc brake, in particular in a pneumatically actuated disc brake.

Different types of wear adjustment devices for disc brakes are known. There are, for example, wear adjustment devices for pneumatically actuated disc brakes, in particular for such pneumatic brakes having a sliding caliper, and for pneumatically actuated fixed or pivoting caliper disc brakes.

Pneumatically actuated disc brakes are now standard equipment in heavy commercial vehicles. Disc brakes of this type require a device for adjusting pad wear. The prior art is an automatically operating wear adjustment, by means of which it is achieved that what is known as the air play, which means the gap between the brake pads and the brake disk in the non-actuated state, is kept constant independently of the wear state and wear behavior of the brake pads.

Disc brakes are found very frequently in commercial vehicles, which disc brakes have a wear adjuster which is arranged concentrically in the cavity of a threaded spindle and is driven eccentrically by the brake lever via a drive element (for example, a shifting finger, or a gearwheel).

In adjustment devices of this type, different overload and coupling devices are provided which can transmit and limit torques which are necessary for actuating the adjustment device (for example, adjusting, resetting, slipping when stops are reached).

An overload and coupling device of this type frequently has a friction combination with at least two contact faces which are in contact. The friction combination is also called a tribological functional unit.

Adjustment devices of this type can have at least one friction combination.

DE 102004037771 A1 (having U.S. counterpart U.S. Pat. No. 7,926,626 B2) illustrates one example.

There is a need for an improved adjustment device as a result of the increased requirements with regard to economy of production and quality (maintenance intervals), a defined position within an installation space which is as small as possible, and increased strength.

It is therefore the object of the present invention to provide an improved adjustment device.

Accordingly, an adjustment device is provided for adjusting wear of the brake pads and brake disk of a disc brake, in particular a pneumatically actuated disc brake having a brake application device which is actuated by a rotary lever. The adjusting device can preferably be inserted into an actuating spindle of the brake application device, and can be attached to a brake caliper of the disc brake by way of a bearing plate. The adjusting device has a spindle and at least one friction combination with, in each case, two contact faces. The adjustment device is distinguished by the fact that the at least one friction combination has a curved cross section of at least one of the contact faces.

The curved cross section of at least one of the contact faces of the at least one friction combination makes lower fluctuation possible of a torque which can be transmitted by means of the friction combination or of a torque limit, since a wide-area contact of the contact faces with the formation of what are known as edge loadings is prevented on account of the curved shape. More precise fixing of the torque is possible.

It is provided in one embodiment that the curved cross section of at least one of the contact faces has at least one elevation with an effective radius. The effective radius can thus not lie at an approximately 25% geometrically induced fluctuation as in the case of flat contact faces between an inner effective radius, for example of 7.5 mm, and an outer effective radius, for example of 10 mm, but rather can be defined more precisely, that is to say, in a geometrically unambiguous manner.

To this end, the curved cross section of at least one of the contact faces is of a convex configuration in one preferred embodiment.

It can be achieved in this way that, after running-in/wear processes, spacings on both sides from the effective radius radially to the outside and to the inside are produced uniformly, as a result of which more precise fixing of the torque, which is transmitted by way of the friction combination, is possible within narrower tolerances than in the prior art by way of planar contact faces.

In a further embodiment, a spindle contact face of the spindle and a contact face of a spherical disk with a spherical section face form the at least one friction combination. The spherical disk makes contact by way of the spherical section face with the bearing plate.

In one embodiment, the spherical disk can have the at least one contact face with the curved cross section. The manufacturing options for the spherical disks can also be adapted or extended simply for the curved cross section.

It is provided here that the spherical disk includes a spherical layer, a carrier section and a spherical disk contact section. The spherical disk contact section is arranged so as to lie opposite the spherical layer and has the at least one contact face with the curved cross section. The spherical disk can be constructed in one piece, or else from two or more components.

In a further embodiment, the spherical disk is provided with a passage which extends axially through the spherical layer and communicates with a hollowed-out portion of the carrier section. The spindle of the adjustment device can extend through the passage. An alignment of the spherical disk with respect to the spindle also is possible.

In another embodiment, an axial passage length of the passage can correspond substantially to an axial layer thickness of the spherical layer.

In another embodiment, at least one of the contact faces can be surface-treated, as a result of which it is additionally possible to influence the friction combination and, therefore, the torque which can be transmitted.

In another embodiment, the spindle contact face of the spindle can have the at least one contact face with the curved cross section. This can also be possible in addition to the contact face of the spherical disk. As a result, simple broadening of the area of use can be made possible.

A disc brake, in particular a pneumatically actuated disc brake, is provided with at least one above-described adjustment device.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
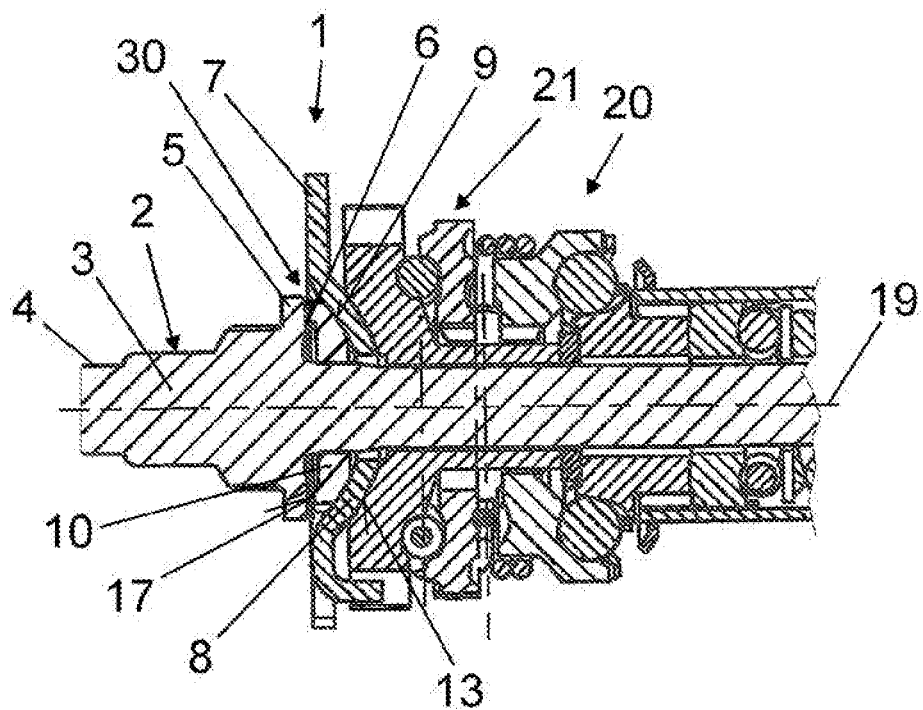
FIG. 1 is a diagrammatic illustration in a partial sectional view of a first exemplary embodiment of an adjustment device according to the invention.

FIG. 1 is a diagrammatic illustration in a partial sectional view of a first exemplary embodiment of an adjustment device 1 according to the invention in an assembled state. The construction and the function of an adjustment device 1 are known and, for example, described in DE 102004037771 A1 (having U.S. counterpart U.S. Pat. No. 7,926,626 B2), the specification of which is incorporated as non-essential matter herein.

The adjustment device 1 according to the first exemplary embodiment includes: a spindle 2 with a spindle body 3 and a drive journal 4, with a corresponding profile for a tool, and a flange 5 at its upper end; a bearing plate 7 for fastening the adjustment device 1 in a brake caliper (not shown) of an associated disc brake; a spherical disk 10; and overload and coupling devices 20, which will not be described further here. The overload and coupling devices 20 are explained, for example, in DE 102004037771 A1. The spindle 2 has a spindle axis 19, which is also a longitudinal axis of the adjustment device 1 and, moreover, an axial bearing 21.

On its side which points toward the overload and coupling devices 20, the flange 5 is provided with a circumferential section which is denoted as spindle contact face 6. The spindle contact face 6 is in contact with a circumferential contact face 17 of the spherical disk 10. The spindle contact face 6 and the contact face 17 form a friction combination (or friction pairing) 30 for the transmission of a defined torque.

The spherical disk 10 is received in a receiving section 8 of the bearing plate 7. A spherical section face 13 (see FIG. 2) of the spherical disk 10 has a spherical section-shaped side which lies opposite the contact face 17 and points toward the overload and coupling devices 20. The receiving section 8 is configured with a corresponding spherical section-shaped receiving face 9 for the spherical disk 10. The side of the receiving section 8 of the bearing plate 7, which lies opposite the receiving face 9, is coupled to the overload and coupling devices 20 (not described in further detail).

Figure 2:
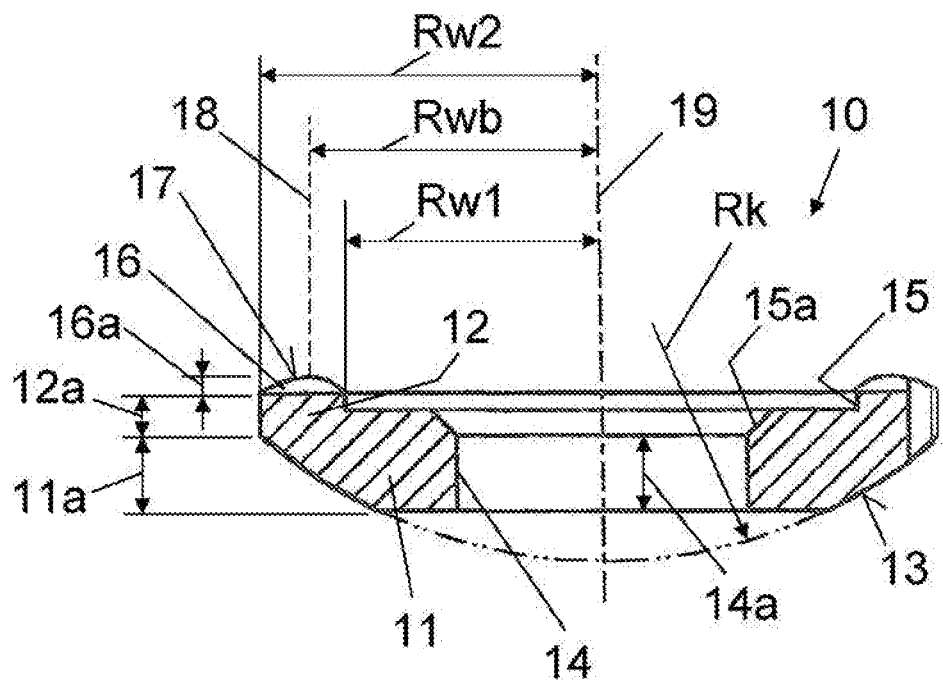
FIG. 2 is an enlarged sectional illustration of a spherical disk.

FIG. 2 shows an enlarged sectional illustration of the spherical disk 10.

The spherical disk 10 includes a spherical layer 11 with a layer thickness 11a, a carrier section 12 with a carrier thickness 12a, and a spherical disk contact section 16 with a spherical contact section thickness 16a. The layer thickness 11a, the carrier thickness 12a and the contact section thickness 16a extend in the direction of the spindle axis 19.

On the side which lies at the bottom in FIG. 2, the spherical layer 11 has the spherical section face 13. The spherical section face 13 is an annularly circumferential face which has a spherical radius Rk. The spherical section which belongs to the spherical section face 13 and has the spherical radius Rk is indicated by way of the dashed and double-dotted curve.

In its axial direction, that is to say in the direction of the spindle axis 19, the spherical layer 11 is provided with a passage 14 which extends in the direction of the spindle axis 19 in a passage length 14a. A diameter of the passage 14 corresponds with an external diameter of a section of the spindle body 3 which runs through the passage 14 in the assembled state of the adjustment device 1 (FIG. 1).

On the side which lies opposite the spherical section face 13, the spherical layer 11 is connected to the carrier section 12. In this exemplary embodiment, the spherical layer 11 and the carrier section 12 are configured in one piece.

From the side which lies opposite the spherical section face 13 (the upper side in FIG. 2), the carrier section 12 is provided with a hollowed-out portion 15 which communicates with the passage 14 of the spherical layer 11. In this example, a chamfer 15a is provided for the transition.

In this exemplary embodiment, the passage length 14a which fixes the beginning of the chamfer 15a axially corresponds substantially to the layer thickness 11a.

As a result of the hollowed-out portion 15, the carrier section 12 is configured with a type of circumferentially flat ring, the inner radius of which is specified here as the inner effective radius Rw1. The outer radius of the carrier section 12 is denoted as the outer effective radius Rw2. From said two effective radii Rw1 and Rw2, a circumferential region which lies between them is fixed. The spherical disk contact section 16 is formed on this circumferential region, which spherical disk contact section 16 is provided for interaction with the spindle contact face 6 on the flange 5 of the spindle 2 (see FIG. 1).

In this exemplary embodiment, at least one tooth (which is not denoted in greater detail) is formed on the circumference of the spherical disk 10 (on the right in FIG. 2) parallel to the spindle axis, which tooth extends through the spherical disk section 11 and the carrier section 12.

In the cross-sectional illustration according to FIG. 2, the cross-section of the spherical disk contact section 16 is of curved configuration with an elevation. In this exemplary embodiment, the curved cross section is of convex form. Other shapes are, of course, also possible, for example oval. The spherical disk contact section 16 has the contact face 17 which lies opposite the spherical section face 13 and, in the assembled state of the adjustment device 1 (FIG. 1), makes contact with the spindle contact face 6.

On account of the sphericity of the spherical disk contact sections 16, an effective radius Rwb is defined in a geometrically unambiguous manner. The effective radius Rwb runs from the spindle axis 19 to an imaginary contact face center line 18 (indicated by a dashed line in FIG. 2) which lies at the highest point of the contact face 17. Here, the expression "highest point" means the greatest spacing of the contact face 17 from an imaginary planar face of the circumferential section of the carrier section 12, which circumferential section is configured as a flat ring. Here, the greatest spacing is the contact section thickness 16a.

In the assembled state of the adjustment device 1 (FIG. 1), the spindle contact face 6 makes contact with the contact face 17, in an ideal and new state, in a circular line with the effective radius Rwb. After running-in and wear processes, the circular line becomes wider, that is to say becomes a circular ring with the mean radius as effective radius Rwb, a substantially identical spacing from the effective radius Rwb being produced and becoming larger in each case in the direction of the inner effective radius Rw1 and in the direction of the outer effective radius Rw2. In other words, the substantially identical spacing is produced radially to the outside and radially to the inside. Both spacings become larger in a homogeneous manner depending on the running in and wear. Contact is therefore ensured between the spindle contact face 6 and the contact face 17 in this friction combination 30.

Figure 3:
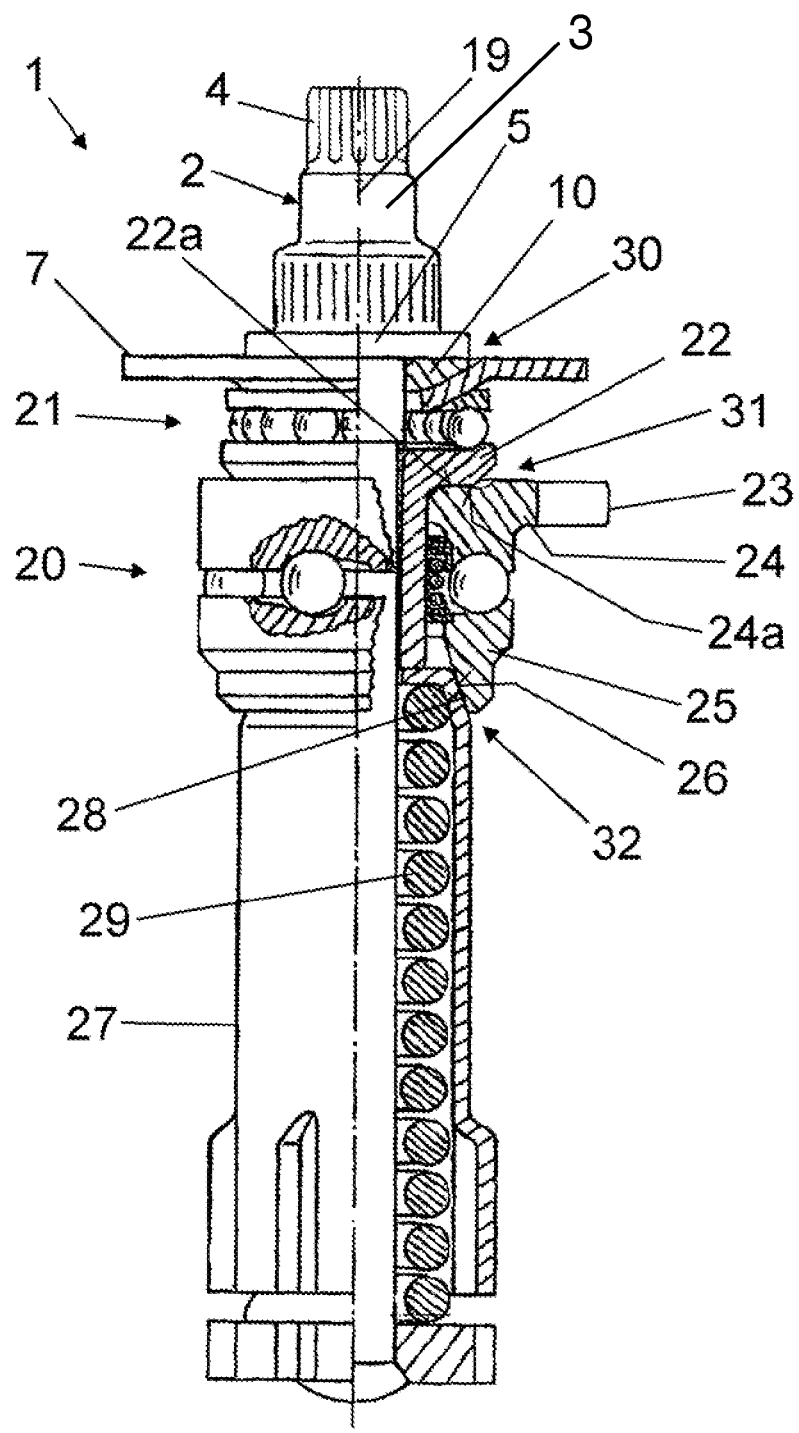
FIG. 3 is a diagrammatic illustration in a partial sectional view of a second exemplary embodiment of the adjustment device according to the invention.

FIG. 3 shows a second exemplary embodiment of the adjustment device 1 according to the invention. The adjustment device 1 has a construction which consists substantially of the following functional elements:
- spindle 2
- bearing plate 7
- axial bearing 21
- flange bushing, or spacer sleeve 22
- shifting fork, or drive ring 23
- overload and coupling device 20, or ball ramp coupling, cone coupling
- cylinder spring 29

This essential construction of the adjustment device 1 is described in DE 10 2004 037 711 A1.

The adjustment device 1 according to the second exemplary embodiment has three friction combinations 30, 31 and 32, which in each case have at least two contact faces which are in contact with one another.

The first friction combination 30 consists of the flange 5 and the spherical disk 10, and has the spindle contact face 6 and the contact face 17 of the spherical disk 10 as contact faces. The configuration of the contact faces 6 and 17 of the first friction combination 30 is described in detail above.

The second friction combination 31 is arranged between a flange bushing 22 of the axial bearing 21 and a coupling bushing 24 which is connected to the drive ring 23. The coupling bushing 24 is a constituent part of the ball ramp coupling of the overload and coupling device 20. The contact faces of the second friction combination 31 comprise a flange bushing contact face 22a and a coupling bushing contact face 24a. The flange bushing contact face 22a and the coupling bushing contact face 24a are configured in the same way as the above-described contact faces 6 and 17 of the first friction combination 30.

The third friction combination 32 is arranged in a cone coupling of the overload and coupling device 20 and comprises a cone bushing contact face 26 of a cone bushing 25 and a spring sleeve contact face 28 of a spring sleeve 27. The cone bushing 25 is also a constituent part of the ball ramp coupling of the overload and coupling device 20. The spring sleeve 27 surrounds the cylinder spring 29.

In all the friction combinations 30, 31, 32, contact is ensured between the associated functional elements. What are known as edge loadings, such as in the case of a planar contact face, are prevented. As a result, a torque which can be transmitted in each case by the friction combinations 30, 31, 32 is stabilized considerably, that is to say the resulting tolerance of the respective torque which can be transmitted is narrow and can therefore be fixed precisely. Fixing of a torque limit, which is defined by the friction combinations 30, 31, 32, is therefore also possible in a precise manner.

The exemplary embodiments of the adjustment device 1 which are described can be arranged, for example, in an actuating spindle of a brake application device of a pneumatic disc brake. For example, DE 197 29 024 C1 describes a construction and function of a pneumatic disc brake of this type. The adjustment device 1 would also be suitable for a disc brake which is actuated by an electric motor.

The invention is not restricted to the above-described exemplary embodiments. It can be modified within the scope of the appended claims. The curved cross section can be configured with more than one elevation. Thus, in the friction combination 30, for example, the convex spherical disk contact sections 16 can be arranged on the underside of the flange 5 of the spindle 2 instead of on the spherical disk 10. The same also applies to the respective contact faces 22a, 24a and 26, 28 of the friction combinations 31 and 32, and also for any further friction combination which is not shown.

It is also contemplated that both the carrier section 12 of the spherical disk 10 and the underside of the flange 5 of the spindle 2 are equipped, in each case, with a convex contact face section. This can also be configured in this way in any other friction combination of the adjustment device 1.

The underside of the flange 5 of the spindle 2 and/or the other contact faces 22a, 26 can be provided with defined surface machining or/and surface coating in order to influence the respective friction combination 30, 31, 32. This is, of course, likewise possible for the respectively associated contact faces 17, 24a, 28.

LIST OF DESIGNATIONS

| | |
|---|---|
| 1 | Adjustment device |
| 2 | Spindle |
| 3 | Spindle body |
| 4 | Drive journal |
| 5 | Flange |
| 6 | Spindle contact face |
| 7 | Bearing plate |
| 8 | Receiving section |
| 9 | Receiving face |
| 10 | Spherical disk |
| 11 | Spherical disk section |
| 11a | Layer thickness |
| 12 | Carrier section |
| 12a | Carrier thickness |
| 13 | Spherical section face |
| 14 | Passage |
| 14a | Passage length |
| 15 | Hollowed-out portion |
| 15a | Chamfer |
| 16 | Spherical disk contact section |
| 16a | Contact section thickness |
| 17 | Contact face |
| 18 | Contact face center line |
| 19 | Spindle axis |
| 20 | Overload and coupling device |
| 21 | Axial bearing |
| 22 | Flange bushing |
| 22a | Flange bushing contact face |
| 23 | Drive ring |
| 24 | Coupling bushing |
| 24a | Coupling bushing contact face |
| 25 | Cone bushing |
| 26 | Cone bushing contact face |
| 27 | Spring sleeve |
| 28 | Spring sleeve contact face |
| 29 | Cylinder spring |
| 30, 31, 32 | Friction combination |
| Rk | Spherical radius |
| Rwb | Effective radius |
| Rw1 | Inner effective radius |
| Rw2 | Outer effective radius |

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An adjustment device for adjusting wear of brake pads and a brake disc of a heavy commercial vehicle disc brake having a brake caliper and a rotary lever actuated brake application device including an actuating spindle in which the adjustment device is insertable, the adjustment device comprising:
   an adjustment device spindle having, adjacent one spindle end, a drive journal with a corresponding profile for a tool, a flange, and a spindle body section located between the drive journal and the flange, the drive journal, the flange, and the spindle body section forming a single piece, unitary body;
   a bearing plate for securing the adjustment device in place in the brake caliper of the heavy commercial vehicle and through which the adjustment device spindle runs away from said one spindle end along a spindle axis; and
   at least one friction combination comprising a spindle contact face of the adjustment device spindle and a circumferential contact face of a disk located between the bearing plate and the flange of the adjustment device spindle,
   wherein at least one of the spindle and circumferential contact faces of the friction combination has a curved cross-section.

2. The adjustment device according to claim 1, wherein the curved cross-section of the at least one of the spindle and circumferential contact faces of the friction combination includes at least one elevation that forms an effective radius of the friction combination.

3. The adjustment device according to claim 2, wherein the curved cross-section has a convex configuration.

4. The disc brake according to claim 2, wherein at least one of the spindle and circumferential contact faces of the friction combination is surface-treated.

5. The disc brake according to claim 2, wherein the located between the bearing plate and the flange has said circumferential contact face and a spherical section face, and the spherical section face contacts the bearing plate.

6. The disc brake according to claim 5, wherein the spindle contact face is provided with the curved cross-section of the friction combination.

7. The disc brake according to claim 5, wherein the circumferential contact face of the disk is formed with the curved cross-section.

8. The disc brake according to claim 7, wherein the disk located between the bearing plate and the flange comprises:
   a spherical layer;
   a carrier section; and
   a spherical disk contact section,
   wherein the spherical disk contact section is arranged at an opposite end from the spherical layer and includes the contact face having the curved cross-section.

9. The disc brake according to claim 8, wherein the disk further comprises a passage extended axially through the spherical layer, the passage communicating with a hollowed-out portion of the carrier section.

10. The disc brake according to claim 9, wherein an axial passage length of the passage corresponds substantially to an axial layer thickness of the spherical layer.

11. The adjustment device according to claim 1, wherein the disk located between the bearing plate and the flange has said circumferential contact face and a spherical section face, and the spherical section face contacts the bearing plate.

12. The adjustment device according to claim 11, wherein the spindle contact face is provided with the curved cross-section of the friction combination.

13. The adjustment device according to claim 11, wherein the circumferential contact face is formed with the curved cross-section.

14. The adjustment device according to claim 13, wherein the disk located between the bearing plate and the flange comprises:
   a spherical layer;
   a carrier section; and
   a spherical disk contact section,
   wherein the spherical disk contact section is arranged at an opposite end from the spherical layer and includes the contact face having the curved cross-section.

15. The adjustment device according to claim 14, wherein the disk further comprises a passage extended axially through the spherical layer, the passage communicating with a hollowed-out portion of the carrier section.

16. The adjustment device according to claim 15, wherein an axial passage length of the passage corresponds substantially to an axial layer thickness of the spherical layer.

17. The adjustment device according to claim 1, wherein at least one of the spindle and circumferential contact faces of the friction combination is surface-treated.

* * * * *